Feb. 5, 1957 R. M. FAGG 2,780,021
BAIT BAG
Filed Oct. 5, 1954
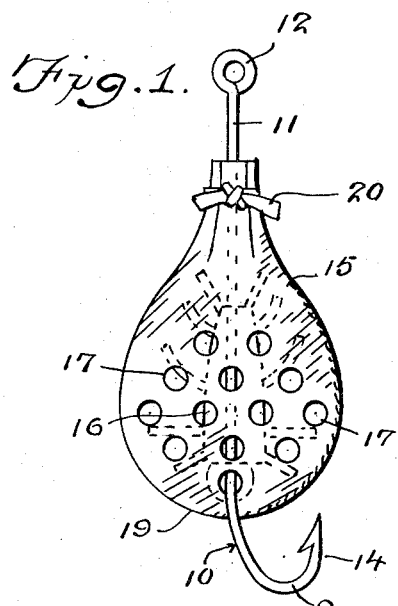
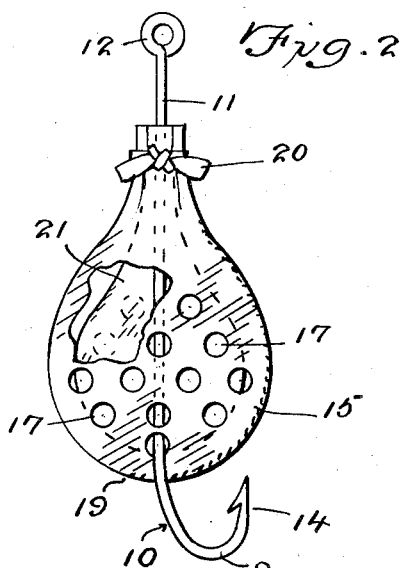
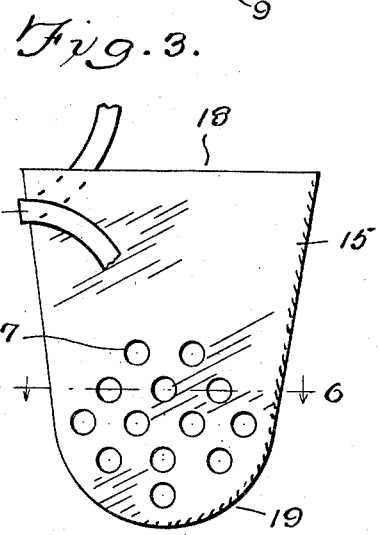
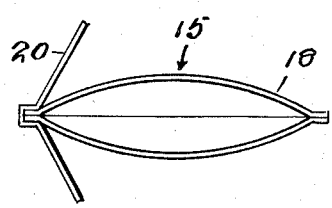
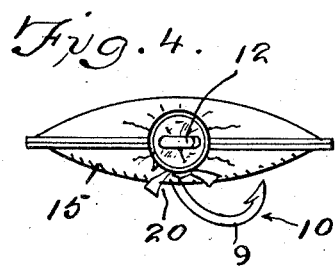
INVENTOR.
Robert M. Fagg
BY Victor J. Evans & Co.
ATTORNEYS

United States Patent Office 2,780,021
Patented Feb. 5, 1957

2,780,021

BAIT BAG

Robert M. Fagg, Dallas, Tex.

Application October 5, 1954, Serial No. 460,326

1 Claim. (Cl. 43—41)

This invention relates to fishing equipment, and more particularly to a bag or container for enclosing fishing bait.

The object of the invention is to provide a bag or container which is adapted to be made of transparent flexible material and wherein the bag is adapted to contain bait whereby the bait will not accidentally become lost while fishing.

Another object of the invention is to provide a bag which is made of transparent material such as a suitable plastic so that bait in the bag will be visible in the water and wherein the bag is provided with a plurality of apertures or openings so that the smell, taste, and the like of the bait is still available to the fish whereby the fish will be readily attracted to the fishhook.

Other objects and advantages will be apparent during the course of the following description.

In the accompanying drawings, forming a part of this application, and in which like numerals are used to designate like parts throughout the same:

Figure 1 is an elevational view showing the bait bag of the present invention in use on a fishhook.

Figure 2 is a view similar to Figure 1, but with parts broken away and in section, and showing a different type of bait in the bag.

Figure 3 is a side elevational view of the bag showing the bag detached from the hook and with the bag open.

Figure 4 is a top plan view of the bait bag showing the bag on the hook.

Figure 5 is a top plan view of the bait bag open and off of the hook.

Figure 6 is a sectional view taken on the line 6—6 of Figure 3.

Referring in detail to the drawings, the numeral 10 designates a conventional fishhook which includes a shank 11 and a barb 14, there being an eyelet 12 on an end of the shank 11 for engagement with a fishing line. Mounted on the fishhook is bait 16, and the present invention is directed to a bag or container 15 which surrounds the bait 16 and prevents accidental loss thereof during fishing.

The bag 15 is adapted to be made of any suitable material such as a transparent flexible plastic, and the bag 15 is provided with a plurality of apertures or openings 17 whereby the odor and taste of the bait 16 will pass out through these openings and attract the fish thereto. The bight 9 of the fishhook may extend below the closed lower end of the bag.

Referring to Figure 3 of the drawings the bag 15 is shown in its open position before it is mounted on the fishhook and bait, and the bag 15 includes a wide open mouth 18 and a rounded closed end 19. A tape or flexible strap 20 which is also of transparent material is secured to the bag 15 in any suitable manner, and the strap 20 is adapted to be wrapped or tied around the end portion of the bag as shown in Figures 1 and 2 and 4, when the bag is being used whereby the strap 20 will maintain the bag in its proper position on the fishhook and bait.

In Figure 2 there is shown a slightly different type of bait 21 on the fishhook 10, and the bait 21 is also positioned within the bag 15 instead of the previously shown bait 16 of Figure 1.

From the foregoing it is apparent that there has been provided a bag which is adapted to hold bait such as the bait 16 or 21, and in use the fishhook 10 is inserted through the open mouth 18 of the bag 15 and then through one of the openings 17 as shown in Figures 1 and 2. The fishhook can then have the bait 16 or 21 arranged thereon, and then the strap 20 is tied around the mouth or neck of the bag as shown in Figures 1, 2 and 4 whereby the bait will be safely retained on the hook within the bag even during fishing. The openings 17 permit the odor and flavor of the bait to pass therethrough whereby fish will be attracted to the hook. Since the bag and strap are both made of transparent flexible material such as a suitable plastic as for example cellophane or a thermoplastic then the bag and strap will be invisible in the water.

The bag is quite small and can be made in any desired size and in use the fishhook 10 is inserted through the bag so that the barb 14 extends beneath the bag and then the bag 15 is filled with a desired type of fish bait and is tied at the top with the string or strap 20. This unit can then be put in the water by a line extended from the fishhook eye 12 and the holes 17 in the plastic permit the smell, taste and the like of the bait 16 or 21 to be available to the fish. At the same time the bait cannot be lost or knocked off the hook unless the bag is torn. This bag is especially suitable or advantageous when baits such as blood, liver and the like are used since such baits are difficult to keep on the hooks. However, the bag can be used with any type of bait that will fit therein.

The bag is very simple and easy to use and can be made of any suitable material such as a thermoplastic which is transparent and colorless. The bag can be used with live grasshoppers, worms and other insects, minnows or any other live bait that will fit into the protective covering or bag. The plastic is invisible under water and is simply attached by sticking the hook through one of the holes in the plastic bag and closing the top by tying the strap 20. The bag will not only hold live bait but will also permit the use of other baits such as congealed blood and the like which would fall through other types of containers. Applicant provides a protective covering for the bait which permits the bait to be used over and over again without loss, but the bag itself is not bait since it is invisible when submerged. And in actual construction, the seams of the bag can be welded or bonded and the bag has the large mouth 18 which tapers down to the rounded bottom 19. The strap 20 can be welded or bonded to the bag and the holes 17 can be punched therein. The plastic material for making the bag will not discolor on immersion in the water or on exposure to sunlight and it remains pliable over temperature ranges of 30 degrees F. to 100 degrees F., and as for example the plastic may be self-bonding at temperatures not to exceed 400 degrees to 600 degrees F., and has a short bonding cycle.

The bag of the present invention has many uses and advantages and for example it keeps the hook baited until larger fish strike at it, and it prevents minnows and small fish from removing the bait. Further, it is not necessary to rebait the hook after catching a fish unless the bag is ripped severely and the hooks can be baited at home and then all of the time on the fishing trip can be used for fishing only. Thus, casting the rod and reel using certain baits can be accomplished whereas such casting could not be previously effected. The bag can be used for melt, liver, heart, shrimp, live and dead minnows, live wiggle worms, doughbait, chicken entrails, cheese bait, stink bait, and other forms of natural fish foods.

I claim:

In combination, a fishhook including a shank having a barb, bait mounted on the shank of said fishhook, a bag of transparent flexible material embracing said bait and provided with a large open mouth graduated down to a rounded closed lower end, there being a plurality of spaced apart apertures in and lengthwise of the side of said bag, said fishhook extending through the lowermost one of said apertures and through the mouth of said bag, and means clamping said bag on said fishhook, said means comprising a flexible strap secured to said bag and adapted to be tied around the mouth of said bag, said strap being transparent, said bag being made of a plastic which is colorless, said bag and strap being invisible under water, and the bight of said fishhook extending below the closed lower end of said bag.

References Cited in the file of this patent

UNITED STATES PATENTS

| | | |
|---|---|---|
| 556,494 | Dales | Mar. 17, 1896 |
| 856,867 | Hayward | June 11, 1907 |
| 2,102,739 | Peters | Dec. 21, 1937 |
| 2,555,088 | Irwin | May 29, 1951 |
| 2,600,314 | Miner | June 10, 1952 |
| 2,639,536 | Hartman | May 26, 1953 |